(12) United States Patent
Jain et al.

(10) Patent No.: US 8,572,760 B2
(45) Date of Patent: Oct. 29, 2013

(54) SYSTEMS AND METHODS FOR SECURE AGENT INFORMATION

(75) Inventors: Amit Jain, Hyderabad (IN); Theodore C. Tanner, Jr., Hollywood, SC (US)

(73) Assignee: Benefitfocus.com, Inc., Charleston, SC (US)

( * ) Notice: Subject to any disclaimer, the term of this patent is extended or adjusted under 35 U.S.C. 154(b) by 135 days.

(21) Appl. No.: 12/943,765

(22) Filed: Nov. 10, 2010

(65) Prior Publication Data
US 2012/0042395 A1    Feb. 16, 2012

Related U.S. Application Data (60) Provisional application No. 61/372,293, filed on Aug. 10, 2010.

(51) Int. Cl.
*G06F 21/24* (2006.01)

(52) U.S. Cl.
USPC .......................................................... 726/30

(58) Field of Classification Search
USPC .......................................................... 726/30
See application file for complete search history.

(56) References Cited

U.S. PATENT DOCUMENTS

| | | | |
|---|---|---|---|
| 6,449,603 B1 | 9/2002 | Hunter | |
| 6,826,597 B1 | 11/2004 | Lonnroth et al. | |
| 7,143,091 B2 | 11/2006 | Charnock et al. | |
| 7,225,183 B2 | 5/2007 | Gardner | |
| 7,792,836 B2 * | 9/2010 | Taswell | 707/737 |
| 7,937,319 B2 * | 5/2011 | Kennis et al. | 705/38 |
| 8,010,567 B2 * | 8/2011 | Subramanyam et al. | 707/791 |
| 2002/0143821 A1 | 10/2002 | Jakubowski | |
| 2003/0177112 A1 * | 9/2003 | Gardner | 707/3 |
| 2003/0196108 A1 * | 10/2003 | Kung | 713/200 |
| 2004/0015701 A1 | 1/2004 | Flyntz | |

(Continued)

FOREIGN PATENT DOCUMENTS

| | | |
|---|---|---|
| JP | 2001265799 | 9/2001 |
| KR | 10-0241646 B1 | 2/2000 |

(Continued)

OTHER PUBLICATIONS

Jain, Amit; PhD Dissertation entitled "Security on the Web: A Semantic-Aware Authorization Framework for Secure Data Sharing"; University of South Carolina College of Engineering and Computing, 2008.*

(Continued)

*Primary Examiner* — Andrew L Nalven
*Assistant Examiner* — Christopher Ruprecht
(74) *Attorney, Agent, or Firm* — John R. Thompson; Stoel Rives LLP (57) ABSTRACT

Semantic information may be secured by an agent using one or more semantic security labels (e.g., security predicates). The agent may be configured to allow other agents to access the semantic information according to a set of semantically expressed policies, strategies, and/or rules. A request to receive information may be mapped to a negotiation policy of the agent. The agent may evaluate the request against a semantic information sharing policy. If the information is accessible under the information sharing policy, the information may be provided. If not, the agent may negotiate information sharing terms using the negotiation ontology, strategy, and rules. Similarly, the agent may request information from other entities. Terms of the information requests may be negotiated using the negotiation ontology, strategy, and rules.

30 Claims, 4 Drawing Sheets

(56) References Cited

U.S. PATENT DOCUMENTS

| | | | |
|---|---|---|---|
| 2004/0015783 A1 | 1/2004 | Lennon et al. | |
| 2004/0098358 A1 | 5/2004 | Roediger | |
| 2004/0153908 A1* | 8/2004 | Schiavone et al. | 714/712 |
| 2005/0216705 A1 | 9/2005 | Shibayama et al. | |
| 2005/0240600 A1 | 10/2005 | Hill | |
| 2005/0278325 A1 | 12/2005 | Mihalcea et al. | |
| 2005/0289342 A1* | 12/2005 | Needham et al. | 713/169 |
| 2006/0059567 A1* | 3/2006 | Bird et al. | 726/27 |
| 2006/0206883 A1 | 9/2006 | Sabbouh | |
| 2007/0074182 A1 | 3/2007 | Hinchey et al. | |
| 2008/0010233 A1 | 1/2008 | Sack et al. | |
| 2008/0010590 A1 | 1/2008 | Curtis et al. | |
| 2008/0021701 A1 | 1/2008 | Bobick et al. | |
| 2008/0033993 A1* | 2/2008 | Uceda-Sosa | 707/104.1 |
| 2008/0040661 A1 | 2/2008 | Curtis et al. | |
| 2008/0086436 A1 | 4/2008 | Zhao et al. | |
| 2008/0127146 A1 | 5/2008 | Liao et al. | |
| 2008/0134286 A1 | 6/2008 | Amdur et al. | |
| 2008/0222634 A1 | 9/2008 | Rustagi | |
| 2008/0222694 A1* | 9/2008 | Nakae | 726/1 |
| 2008/0294624 A1 | 11/2008 | Kanigsberg et al. | |
| 2009/0031225 A1 | 1/2009 | Toebes et al. | |
| 2009/0089312 A1 | 4/2009 | Chi et al. | |
| 2009/0094231 A1 | 4/2009 | Marvit et al. | |
| 2009/0100045 A1* | 4/2009 | Feng et al. | 707/5 |
| 2009/0254540 A1 | 10/2009 | Musgrove et al. | |
| 2009/0300002 A1* | 12/2009 | Thomas et al. | 707/5 |
| 2009/0328188 A1* | 12/2009 | Raymer et al. | 726/14 |
| 2010/0023997 A1* | 1/2010 | Hu et al. | 726/1 |
| 2010/0049687 A1* | 2/2010 | Patten et al. | 706/47 |
| 2010/0145720 A1* | 6/2010 | Reiner | 705/2 |
| 2010/0146593 A1* | 6/2010 | Stahl et al. | 726/4 |
| 2010/0169966 A1* | 7/2010 | Yalamanchi et al. | 726/21 |
| 2010/0287158 A1* | 11/2010 | Toledano et al. | 707/718 |
| 2011/0126281 A1* | 5/2011 | Ben-Zvi et al. | 726/21 |
| 2011/0161847 A1 | 6/2011 | Chaikin et al. | |
| 2011/0321051 A1 | 12/2011 | Rastogi | |
| 2012/0102050 A1* | 4/2012 | Button et al. | 707/749 |

FOREIGN PATENT DOCUMENTS

| | | | |
|---|---|---|---|
| WO | WO01/09831 | A2 | 2/2001 |
| WO | WO 01/09831 | A2 | 2/2001 |
| WO | WO 0125882 | | 4/2001 |
| WO | WO 02/097667 | A2 | 12/2002 |

OTHER PUBLICATIONS

International Search Report and Written Opinion for PCT/US2011/046888 filed Aug. 8, 2011, mailed Mar. 16, 2012.

Office Action for U.S. Appl. No. 12/534,676, mailed Nov. 14, 2011.

Office Action for U.S. Appl. No. 12/534,676, mailed Feb. 27, 2012.

Wei, Liu et al., Semi-Automatic Ontology Extension Using Spreading Activation, Journal of Universal Knowledge Management, vol. 0, No. 1 (2005), pp. 50-58, submitted: Feb. 7, 2005, accepted: Apr. 18, 2005, published: Jun. 28, 2005.

Office Action for U.S. Appl. No. 12/573,573 mailed Jun. 14, 2012.

International Search Report and Written Opinion mailed Dec. 17, 2009 in PCT Application No. PCT/US09/52640, filed Aug. 4, 2009.

International Search Report and Written Opinion mailed Dec. 3, 2009 in PCT Application No. PCT/US09/059527, filed Oct. 5, 2009.

Jain, Amit and Farkas, Csilla, Article entitled "Secure Resource Description Framework: an Access Control Model", Center for Information Assurance Engineering, Department of Computer Science & Engineering, University of Carolina, Columbia, South Carolina, 2006 (9 pgs.).

Office Action for U.S. Appl. No. 12/534,676, filed Aug. 3, 2009, and mailed Oct. 1, 2012.

Sieg, Ahu, et al., "Representing Context in Web Search with Ontological User Profiles," School of Computer Science, Telecommunication and Information Systems, DePaul University, Chicago, Illinois, pp. 439-452, 2007.

International Preliminary Report on Patentability for PCT/US2011/046888 filed Aug. 8, 2011, and mailed Feb. 21, 2013, 5 pgs.

Notice of Allowance and Fee(s) due for U.S. Appl. No. 12/573,573, filed Oct. 5, 2009, and mailed from the USPTO Dec. 3, 2012, 15 pgs.

Marsman, Jennifer, Microsoft, "Visual Studio 2010: How to understand your code using dependency Graphs, Sequence Diagrams, and the Architecture Explorer," 2010, http://blogs.msdn.com/b/jennifer/archive/2010/05/11/visual-studio-2010-how-to-understan . . . , last visited Mar. 25, 2013.

USPTO, Office Action for U.S. Appl. No. 13/107,634, mailed Apr. 2, 2013.

Notification of First Office Action for Chinese Patent Application No. 200980126895.0, issued Mar. 29, 2013.

Jain, Amit: Dissertation entitled "Security on the Web: A Semantic-Aware Authorization Framework for Secure Data Sharing," 2008.

* cited by examiner

SYSTEMS AND METHODS FOR SECURE AGENT INFORMATION

RELATED APPLICATIONS

This application claims priority under 35 U.S.C. §119(e) to U.S. Provisional Patent Application Ser. No. 61/372,293, filed Aug. 10, 2010, and entitled "SYSTEMS AND METHODS FOR SECURE AGENT INFORMATION," which is hereby incorporated by reference in its entirety.

TECHNICAL FIELD

This disclosure relates to systems and methods for sharing semantic data and, in particular, to systems and methods for applying semantic-based security predicates to shared structured and unstructured data.

BRIEF DESCRIPTION OF THE DRAWINGS

Additional aspects and advantages will be apparent from the following detailed description of preferred embodiments, which proceeds with reference to the accompanying drawings, in which.

DETAILED DESCRIPTION OF PREFERRED EMBODIMENTS

There is an increasing amount of data available via data communications networks. This data may be controlled by one or more entities. In order to control access to the data, the entity may store the data in a data storage system (e.g., database storage systems, directory systems, and the like), that is accessible only in a controlled network environment, such as within a Local Area Network (LAN) controlled by the entity and/or within the entity's Virtual/Private Local Area Network (VLAN). Where the entity makes the data available on a more widely accessible network (e.g., the Internet), access to the data may be controlled by the entity's security system and/or access control rules, such as role-based access control (RBAC), discretionary access control (DAC), or the like.

An entity may wish to share information with other entities. However, data sharing between entities may be problematic, since access to the data may be secured using entity-specific security and access control rules. Translation between security systems may be a complicated, manual process which may be time-consuming and problematic. Moreover, the translation may result in data security problems, since the receiving entity may choose to disregard the security directives of the sending entity.

In addition, the data shared by entities may be expressed semantically. The semantic expression of data may allow it to be processed autonomously (e.g., by expert systems, agents, or the like), which may significantly increase the value of the data and allow for sophisticated data mining, data analysis, and other applications. The Resource Description Framework (RDF) provides a machine understandable description data, including resources, resource properties, and relationships. Other examples of semantic data formats include, Web Ontology Language (OWL), OWL 2, Resource Description Format Schema (RDFS), and the like.

As used herein, an ontology and/or semantic data may refer to an organized collection of knowledge referring to both the meaning of terms (e.g., concepts) and relationships between concepts. In some embodiments of this disclosure, semantic data (e.g., ontological data) may comprise a plurality of vertices (e.g., nodes) interconnected by one or more edges. The vertices within the ontology graph may be concepts within the ontology, and the edges interconnecting the vertices may represent relationships between related concepts within the ontology.

Traditional security and/or access control systems may be ineffective at properly controlling access to semantic data. For example, many semantic data formats (e.g., RDF), may allow the same "statement" (e.g., resource, property, and/or value) to be expressed in many different ways using many different syntaxes. Traditional security systems may be incapable of applying access control rules to all of the possible permutations and/or expression formats of the data. Moreover, manually applying such rules would quickly become untenable.

In addition, semantic data may be used to infer and/or entail other related semantic data. A security and/or access control system must apply consistent access control rules to inferred and/or entailed information (e.g., prevent protected data from being "inferred" and/or "entailed" from less protected data).

Moreover, the negotiation between entities relating to security policies may be streamlined or even automated. Streamlining the security negotiation process between entities may allow data sharing between a large number of entities, which, in turn, may significantly increase the value of the data controlled by the entities.

In some embodiments disclosed herein, access to semantic data (e.g., RDF content) may be controlled by a Secure Resource Description Framework (SRDF). RDF semantic data may comprise a set of triples organized into a named, directed graph structure including resources, properties, references, literals, and variables. An RDF statement is a resource rectifying triple, comprising three properties: an RDF subject, object, and predicate. The SRDF may operate by applying security predicates to RDF statements using an RDF pattern.

An RDF pattern may comprise a triple, where each component is either a data constant or a variable. A pattern mapping may be a mapping between a first RDF pattern $PT_1$ and a second RDF pattern $PT_2$ such that, for the mapping V, V: $PT_1 \rightarrow PT_2$. An SRDF security policy may comprise a set of pairs SP=$\{sp_1, \ldots, sp_n\}$, such that every security policy comprises a respective security label and corresponding pattern. The security label (e.g., a security predicate) may be applied to RDF statements matching the pattern. The security predicate may control access to the RDF statement, assign security classifications to newly generated statements (e.g., to which the security policy pattern corresponds), and check for unauthorized inferences (discussed below).

An SRDF security cover may be a set of all the RDF security policy mappings. The security cover may further comprise rules describing how security label conflicts are managed (e.g., in the event that multiple patterns match a particular RDF statement).

The SRDF may include conflict resolution rules. Some of these rules may define which security label (e.g., security predicate) is mapped to a particular RDF statement in the event that several security labels map thereto. The conflict resolution rules may further include rules to handle inference conflicts, which may occur due to newly entailed RDF statements. In one embodiment, the conflict resolution rules may be comprised of a table of mappings to such statements. However, a generated RDF statement may already be within the security cover and have a different security label. The difference in the security labels may create a security policy violation (e.g., if the existing RDF statement has a "higher" or different security level than the inferred RDF statement). In some embodiments, this type of "inferred" conflict may be detected if the security label of an inferred statement is "lower" (e.g., less restrictive) than an existing statement.

An inferred conflict may be resolved in a number of different ways, according to the preferences and/or security requirements of the entity. For example, the security label of the inferred statement may be completely subsumed (e.g., replaced) by the original, "higher" security label. Alternatively, in some embodiments, the security policy may allow the inferred statement to retain the less restrictive security level. If the new label is "higher" (e.g., more restrictive) than the original label, the new label may be retained. In some cases, the security level may be demoted to the original level. Alternatively, or in addition, the resulting security label may comprise a combination of the original security label and the new, inferred label.

In some embodiments, a security policy (e.g., set of security labels and associated mappings) may be checked for consistency. This may comprise detecting direct and inferred conflicts within the policy. If the checking indicates that conflicts exist (e.g., either direct and/or inferred), a policy maintainer may be informed and appropriate action recommended. Alternatively, or in addition, the security policy may be automatically modified to remove the direct and/or inferred conflicts substantially as discussed above (e.g., by subsuming one or more conflicting policies, retaining an inferred security label, and/or by combining security labels).

Using the security predicates discussed above, systems and methods may be developed to facilitate secure data sharing between entities. The data shared between the entities may comprise unstructured data and/or structured data (e.g., semantic data formatted according to RDF).

Figure 1:
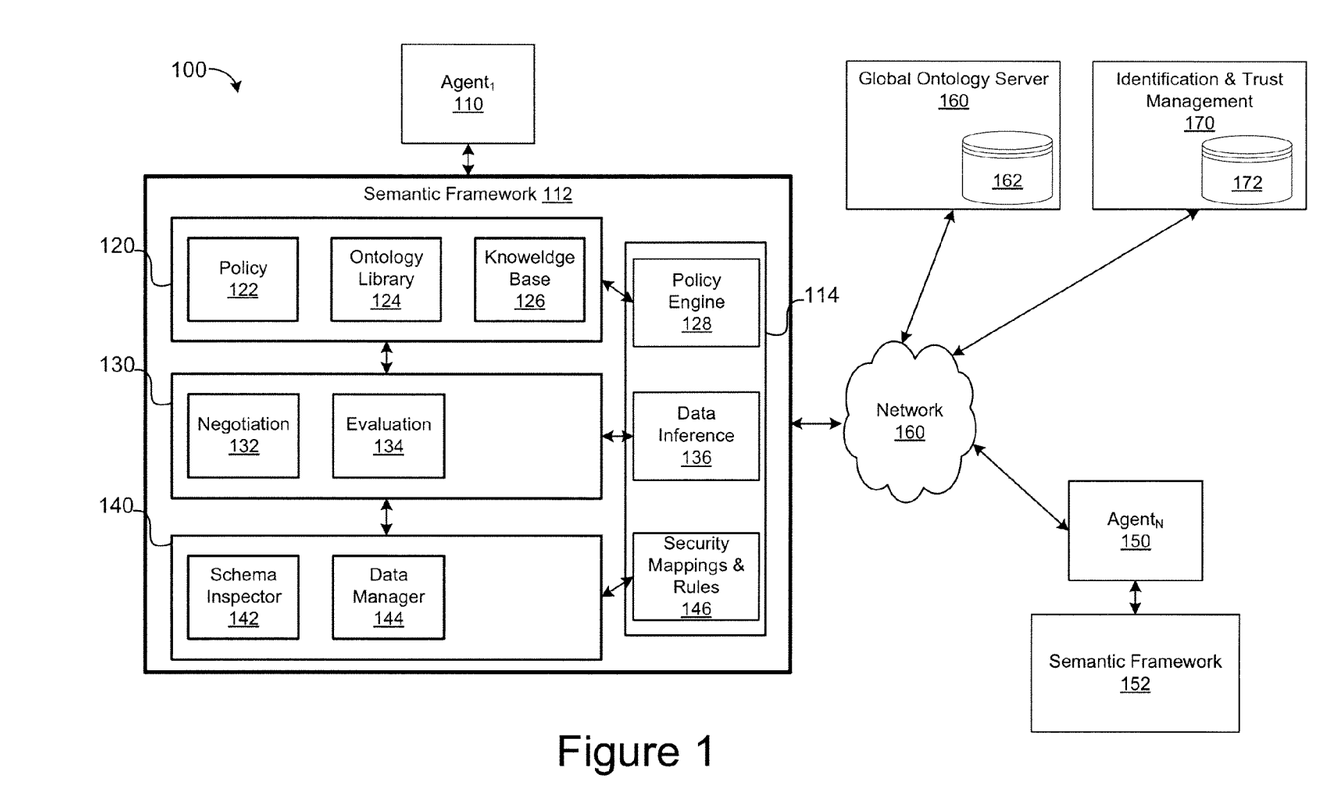
FIG. 1 is a block diagram of one embodiment of a system for semantically securing and sharing semantic information.

FIG. 1 is one embodiment of a system for secure sharing of agent information. An $agent_1$ 110 may be communicatively coupled to a network 160. The network 160 may comprise any communications network known in the art including, but not limited to: an Internet protocol (IP) network (e.g., a Transmission Control Protocol IP network (TCP/IP) or the like), a local area network (LAN), a wide area network (WAN), a virtual private network (VPN), a wireless network (e.g., IEEE 802.11a-n, Bluetooth®, EDGE, G3, or the like), a public switched telephone network (PSTN), a cellular telephone network, or the like.

The $agent_1$ 110 may comprise a human agent, an expert system, or any other entity capable of processing and/or controlling the flow of structured and/or unstructured data. In some embodiments, the $agent_1$ 110 may comprise a computing device (not shown). The computing device of the $agent_1$ 110 may comprise one or more processors (not shown) communicatively coupled to memory (not shown), data storage, such as a hard disc, storage area network, or the like (not shown), one or more input/output devices, such as a keyboard, a mouse, a display, and the like (not shown), a communications interface (not shown), and the like.

The computing device may be substantially autonomously controlled by a software $agent_1$ 110 (e.g., an expert system or the like). The software $agent_1$ 110 may comprise a user interface by which a human operator (not shown) may control the operation of the $agent_1$ 110. Alternatively, or in addition, the $agent_1$ 110 may be substantially directly controlled by a human operator.

The $agent_1$ 110 may be communicatively coupled to a semantic framework 112. In some embodiments, the semantic framework 112 may be a component of the $agent_1$ 110 (e.g., be hosted on the computing device of the $agent_1$ 110 or the like). Alternatively, or in addition, portions of the semantic framework 112 may reside on one or more separate computing devices (not shown). In this case, the computing device of the $agent_1$ 110 may be communicatively coupled to the one or more computing devices comprising the semantic framework 112 via a communications network, such as the network 160, a separate LAN (not shown), a VPN (not shown), or the like.

The semantic framework 112 may comprise information managed and/or controlled by the $agent_1$ 110. For example, the $agent_1$ 110 may represent a healthcare provider (e.g., a health maintenance organization), and, as such, the information managed by semantic framework 112 of the $agent_1$ 110 may include healthcare statistics, patient records, billing information, and the like.

The semantic framework 112 may comprise a data, ontology, and rules layer 120 comprising a policy module 122, an ontology library 124, and a knowledge base 126. The policy module 122 may comprise a security policy defining a security and/or access control policy of the semantic framework 112.

The policy module 122 may comprise rules governing information sharing between entities in the network 160 (e.g., between the $agent_1$ 110 and other, external entities, such as the $agent_N$ 150). The policy module 122 may comprise policies represented using a policy language having different language constructs, such as actors, actions, obligations, authorizations, delegation, privacy, and so on. For example, an "actor" within the policy module 122 may correspond to a particular agent (e.g., $agent_N$ 150) on the network 160 and/or an individual within the $agent_N$ 150 (e.g., a sub-agent of the $agent_N$ 150, such as an employee, a delegee, or the like).

The policy information of the policy module 122 may be divided into various, different sub-policies according to the requirements of the $agent_1$ 110. For example, the policy module 122 may comprise one or more sharing policies defining how the $agent_1$ 110 is to share information with entities on the network 160. The policy module may further comprise policies directed to trust management (e.g., which entities the $agent_1$ 110 trusts), delegation policies, privacy policies, authentication policies, authorization policies, and the like.

The policy module 122 may comprise ontology-based policies (e.g., semantic policies), which may be used to represent the dynamic entities (e.g., conceptual information) managed by the semantic framework 112 (e.g., within the ontology library 124). These ontology-based policies may define policy elements, such as subjects, resources, credentials, and obligations between ontological elements (e.g., between resources, properties, values, and the like within the ontology library 124 and/or accessible in an ontology 162 of the global ontology server 160).

The policies information of the policy module 122 may comprise security labeling information (e.g., may comprise security predicates, such as the SRDF security labels discussed above). The labels may indicate whether a particular policy is available to other agents on the network 150 and/or whether the policy is private.

The ontology library 124 may comprise a domain-specific ontology of the $agent_1$ 110. The ontology library 124 may be used to represent domain information of the $agent_1$ 110. The ontology library 124 may comprise ontology information in RDF, OWL, OWL2, or another related format. The ontology library 124 may be used to semantically classify unstructured data and/or to import semantic data from a third-party, external source (e.g., agent$_N$ 150).

Various systems and methods for mapping unstructured data to concepts within an ontology are disclosed in co-pending provisional application entitled "Systems and Methods for Concept Mapping," Ser. No. 60/086,335, filed Aug. 5, 2008, to Gregory Jorstad et al., which is hereby incorporated by reference in its entirety.

The ontology library 124 may be used to semantically represent the data managed and/or controlled by the agent$_1$ 110. Accordingly, the ontology library 124 may be a domain-specific ontology tailored to the particular application provided by the agent$_1$ 110. For instance, as discussed above, the agent$_1$ 110 may be associated with a healthcare provider. As such, the ontology library 124 may comprise detailed healthcare related concepts and relationships. In contrast, an ontology library 124 of an agent$_1$ 110 associated with another type of entity (e.g., an investment banking institute) may comprise detailed concepts and relationships related to other areas. Moreover, one or more of the agents 110 or 150 may operate using a sparse ontology library 124 to improve efficiency (e.g., an ontology where concepts that are unrelated to the application area of the agent 110 or 150 are removed).

The ontology library 124 may be a secure ontology, such that the information stored therein may be mapped to a security policy (e.g., a security label and/or predicate). The security policy of the semantic framework 112 may comprise a plurality of security patterns, including a default security pattern, which may leave no data within the ontology library 124 unclassified and/or without a security label. The security label applied to the data within the ontology library 124 may be periodically updated as the security policies of the semantic framework 112 are revised.

As will be discussed below, some applications of the system 100 may require that information corresponding to an ontology of a first agent (e.g., agent$_1$ 110) be mapped or translated to an ontology of a second agent (e.g., agent$_N$ 150). As discussed above, however, the domain-specific ontology library 124 of the agents 110 and 150 may differ, which may make a straight-forward, one-to-one mapping between the respective ontology libraries problematic. In this case, one or more of the agents 110 and 150 may access an ontology 162 of the global ontology server 160. The global ontology 162 may be a more "complete" (non-sparse) ontology library. An agent 110 or 150 receiving information corresponding to an unknown concept (e.g., a concept that does not appear in the local ontology library 124 of the agent) may determine a mapping into the local ontology 124 using the concepts and/or relationships provided by the global ontology 162. Alternatively, or in addition, an agent (e.g., agent$_1$ 110) may perform a "one-time" import of a portion of the global ontology 162 provided by the global ontology server 160 in order to effectively process data from a third-party, external agent (e.g., agent$_N$ 150).

The knowledge base module 126 may comprise the semantic data managed and/or controlled by the semantic framework 112. As discussed above, the knowledge base 126 may comprise data in semantic form (e.g., in RDF, OWL, OWL2, or the like). The data within the knowledge base 126 may comprise the security labels discussed above in conjunction with the ontology library 124.

The semantic framework 112 may comprise a negotiation layer 130. The negotiation layer 130 may allow the semantic framework 112 to securely share information with other agents accessible via the network 160 (e.g., agent$_N$ 150 discussed below).

The negotiation layer 130 may comprise a negotiation module 132, which may be configured to negotiate security and/or access control policy between the agent$_1$ 110 and another, third-party agent. For example, the negotiation module 132 may determine what, if any, access another agent (agent$_N$ 150) is given to information managed and/or controlled by the agent$_1$ 110. Similarly, the negotiation module 132 may determine whether information provided by the agent$_N$ 150 may be stored in the knowledge base 126 of the agent$_1$ 110.

In some embodiments, the negotiation module 132 may track multiple iterations of trust establishment between entities (e.g., between the agent$_1$ 110 and other, external agents, such as agent$_N$ 150). Therefore, the negotiation module 132 may be configured to access negotiation ontologies, negotiation strategies, and negotiation rules applicable to a particular entity. For instance, a data sharing negotiation between the agent$_1$ 110 and the agent$_N$ 150 may comprise evaluating credentials provided by the agent$_N$ 150, an authorization level of the agent$_N$ 150, a trust status of the agent$_N$ 150, and the like. As is discussed below, the credentials provided by the agent$_N$ 150 as part of a data sharing negotiation may be verified using an identification and trust management service 130. This may allow the agent$_1$ 110 to verify the identity of the agent$_N$ 150 (e.g., verify the authenticity of messages transmitted from the agent$_N$ 150).

A data sharing negotiation between the agent$_1$ 110 and the agent$_N$ 150 may involve several iterations comprising offers and counteroffers between the entities. For example, the agent$_1$ 110 may provide access to the information it manages and/or controls to other agents (e.g., agent$_N$ 150) on the network 160. The agent$_1$ 110 may impose conditions on this data sharing. For example, the agent$_1$ 110 may require that the data sharing be reciprocal, may require that the agent$_N$ 150 have particular data security measures in place to protect the information, the agent$_1$ 110 may require that the agent$_N$ 150 only allow the data to be used in a certain way (e.g., according to a license), and so on. Accordingly, the negotiation module 132 may use the negotiation ontologies, strategies, and/or rules (e.g., business rules) discussed above to autonomously negotiate data sharing with the agent$_N$ 150 (e.g., using a match-making engine, such as the evaluation module 134 discussed below). Alternatively, or in addition, one or more users (e.g., human actors) may intervene in the negotiation process by establishing a trust relationship, data sharing rules, and the like (e.g., may bootstrap a negotiation between the agent$_1$ 110 and the agent$_N$ 150).

The evaluation module 134 may be used to evaluate whether an information sharing offer (e.g., negotiation) from an external entity (e.g., the agent$_N$ 150) should be accepted and/or whether a counteroffer should be returned. The evaluation module 134 may evaluate the negotiation ontology, strategy, and/or rules of the negotiation module 132 against an offer and/or information request from an external entity (e.g., agent$_N$ 150) and may determine whether the offer will be accepted and/or whether a counteroffer will be returned. Accordingly, the evaluation module 134 may comprise a matchmaking engine and/or other reasoning system.

In making negotiation decisions, the evaluation module 134 may access an identification and trust management service 170 The identification and trust management service 170 may comprise and/or may be communicatively coupled to a user store 172 (e.g., user identification database or the like) to allow the evaluation module 134 and/or other components within the semantic framework 112 to verify (e.g., authenticate) the identity of external, third-party entities (e.g., $agent_N$ 150) and/or authentication message transmitted by the entities. For example, an $agent_N$ 150 may submit a request for information to the $agent_1$ 110. The semantic framework 112 of the $agent_1$ 110 may be used to negotiate access to the desired information with the $agent_N$ 150. Alternatively, or in addition, if a negotiation has already occurred, the semantic framework 112 may determine whether the information sharing arrangement negotiated with the $agent_N$ 150 allows for access to the requested information. As discussed above, this evaluation may be based upon a negotiation between the $agent_1$ 110 and the $agent_N$ 150 comprising a negotiation ontology, strategy, and rules. The nature of the negotiation and/or subsequent access to information may depend upon the identity of the $agent_N$ 150.

For instance, the $agent_1$ 110 may have a long-standing, established relationship with the $agent_N$ 150. As such, the $agent_N$ 150 may negotiate a relatively high level of access to the information managed and/or controlled by the $agent_1$ 110. Similarly, the $agent_1$ 110 may trust information provided by the $agent_N$ 150. Alternatively, the $agent_N$ 150 may be a relative unknown to the $agent_1$ 110. In fact, in some cases, the $agent_1$ 110 may not have any established business relationship with the $agent_N$ 150. In this case, the $agent_N$ 150 may be granted a relative lower level of access to the information managed and/or controlled by the $agent_1$ 110. However, as data is shared between the $agent_1$ 110 and the $agent_N$ 150, the information sharing policy negotiated therebetween may be adapted to reflect increased trust between the $agent_1$ 110 and the $agent_N$ 150.

The identity of the $agent_N$ 150 may be determined using a number of different mechanisms. In some embodiments, messages transmitted between the $agent_1$ 110 and the $agent_N$ 150 may comprise a signature (e.g., an X.509 signature or the like). In this embodiment, the identification and trust service 130 may be communicatively coupled to a data store 132 comprising a plurality of trusted public key certificates to verify digital signatures from trusted entities. In other embodiments, the messages transmitted between the agents 110 and 150 may comprise an authentication token, such as a WS-Security token, a Kerberos ticket, a Security Assertions Markup Language (SAML) assertion, or the like.

The secure framework 112 may further comprise harvesting module 140, which may include a schema inspector 142 and data manager 144. The schema inspector 142 may provide a mapping between unstructured and/or structured data and the ontology library 124 of the $agent_1$ 110, substantially as described above (e.g., using a concept mapping system or method). In addition, the schema inspector may be configured to apply a security label (e.g., security predicate) to the mapped data. As discussed above, this may comprise matching concepts identified in the incoming data (e.g., RDF statements) against a security pattern (stored in the security mappings and rules module 146 discussed below). Security label(s) associated with a security pattern matching may be applied to the concept. Mapped and secured concepts may be transmitted to and stored by the knowledge base module 126.

The data manager 144 may manage the retrieval and dissemination of data by the $agent_1$ 110. The $agent_1$ 110 may be configured to acquire data from an unstructured data source, via data mining, or another data retrieval process. In addition, the data manager 144 may allow the $agent_1$ 110 to transmit requests for information to other agents via the network 160, such as the $agent_N$ 150. Similarly, the data manager 144 may allow the $agent_1$ 110 to respond to requests for information from other agents on the network 160. Accordingly, the data manager 144 may be configured to communicate with various data sources, such as databases (e.g., Structured Query Language (SQL) databases, XML databases, or the like), directories (e.g., X.509 directories, Lightweight Directory Access Protocol (LDAP) directories, or the like), file systems (e.g., a hierarchical file system, flat file system, distributed file system, or the like), or other data storage systems. In addition, the data manager 144 may be configured to communicate with agents over the network 144 using a communication protocol, such as Remote Method Invocation (RMI), Simple Object Access Protocol (SOAP), Web Services Description Language (WSDL), or another communications protocol.

A security layer 114 may be used to control the operation of the semantic framework 112 and, in particular, to apply security labels (e.g., security predicates) to the information managed and/or controlled by the $agent_1$ 110, to translate between security labels of the $agent_1$ 110 and those of other, external agents (e.g., $agent_N$ 150), and to negotiate security policies between the external agents.

The security layer 114 may comprise a security mappings and rules module 146. As unstructured data is retrieved by the data manager 144, it may be semantically mapped into an ontology as described above (e.g., using the schema inspector 142, the ontology library 124, and/or the global ontology service 160). Similarly, semantically structured data retrieved by the data manger may be mapped to the ontology of the $agent_1$ 110. The security mapping and rules module 146 may apply security labels to the imported semantic data by applying one or more security patterns to the data (e.g., security labels may be applied to the data per the security patterns discussed above). The data, along with the associated security labels (e.g., security predicates) may be stored in the knowledge base 126.

The security layer 114 may further comprise a data inference module 136. As discussed above, semantic information may be expressed in various different ways. Accordingly, information inferred and/or entailed from semantic information may be given a different security label than the same data already within the knowledge base 126. If the security label applied to the inferred and/or entailed information is less-restrictive than that of the information already within the semantic framework 112, the inferred and/or entailed information may represent a security leak (e.g., information that is intended to be accessible according to a "high" level security label may be accessible via a "lower" level security label). Similarly, in some cases, multiple security labels may map to a particular semantic data statement. The data inference module 136 may be configured to resolve these conflicts according to a security policy of the security layer 114 (e.g., as stored in the security mapping and rules module 146).

The policy engine 128 of the security layer may be configured to interpret the policies stored in the policy module 122. As discussed above, the policy module 122 may comprise a plurality of different policy types including, but not limited to policies relating to: information sharing (e.g., between agents on the network 160); trust management policies, delegation policies, privacy policies, authentication policies, authorization policies, and ontological policies, and the like. The ontological policies may be used to represent dynamic elements within the semantic framework 112, such as subjects, resources, credentials and obligations (e.g., according to the ontology library 124). Accordingly, the policy 122 may comprise policy information developed according to an information sharing negotiation between the $agent_1$ 110 and external, third-party agents, such as $agent_N$ 150. This negotiated policy may define the information sharing relationship between the $agent_1$ 110 and the $agent_N$ 150, including, but not limited to: to the subjects with which information may be shared, resources to be shared (e.g., including the security level available to the agent$_N$ 150), credentials required by the agent$_N$ 150, and obligations of the agent$_N$ 150 and/or agent$_1$ 110.

The policy engine 128 may be configured to interpret the policy information stored in the policy module 122 to accept credentials from external agents, such as the agent$_N$ 150, and make access decisions accordingly (e.g., based on the identity of the agent, the credentials supplied by the agent, a security label of the information requested by agent, and the like).

Figure 2:
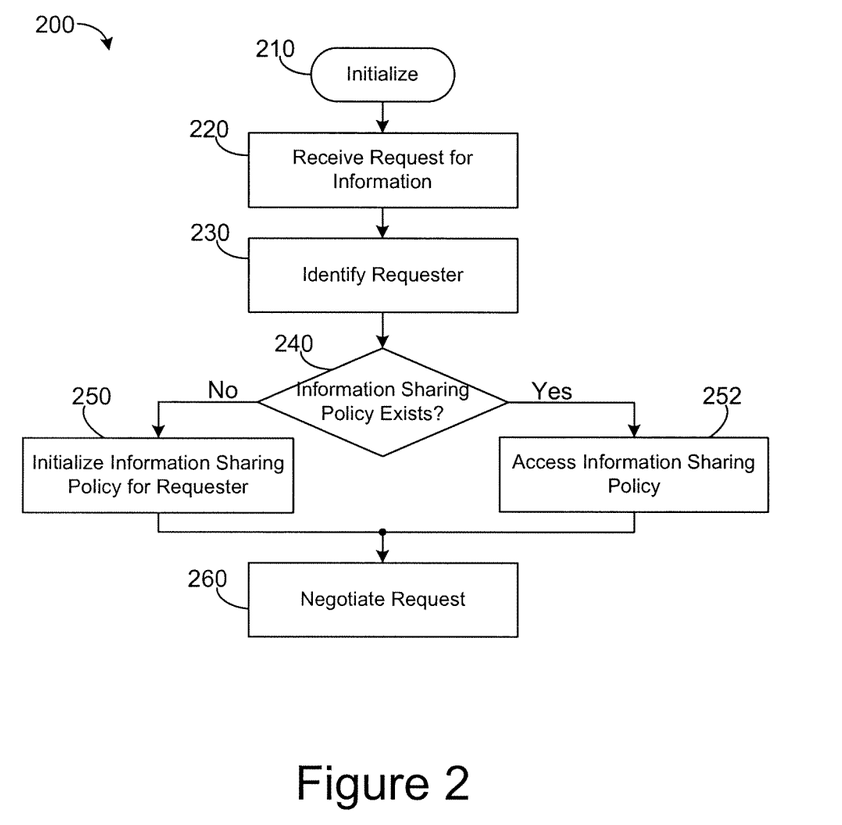
FIG. 2 is a flow diagram of one embodiment of a method for sharing semantically secured information.

FIG. 2 is a flow diagram of one embodiment of a method 200 for negotiating an information sharing policy between two or more agents.

At step 210, the method 200 may be initialized. This may comprise accessing information required for the negotiation process, such as a negotiation ontology, negotiation strategy, and/or negotiation rules. The initialization of step 210 may further comprise accessing a global ontology service 160 and/or identification and trust service, such as the services 160 and 170 of FIG. 1. These services may allow the method 200 to translate semantic information from an external agent into a domain-specific ontology accessible to the method 200 (e.g., negotiation ontology of the method 200). The identification and trust service may allow the method 200 to authenticate messages transmitted from external entities.

At step 220, the method 200 may receive a request for information managed and/or controlled by the method 200. The request may comprise a request to establish an information sharing policy between the semantic framework of the method 200 and an external entity.

At step 230, the method 200 may determine an identity of the submitter of the request. This may comprise accessing identifying information stored in the message (e.g., a digital signature, key, password, SAML assertion, or the like). In addition, authenticating the identity of the requester may comprise accessing an identification and trust management service (e.g., an OpenID service, a certificate authority, or the like).

The identity of the requester may be unknown to the method 200 (e.g., this may be the first information request from the requester). In this case, the method 200 may dynamically identify the requester using a dynamic identification system, such as OpenID discussed above, or other federated identity service (e.g., a trusted root certification authority, or other dynamic credential issuance and verification framework). This may allow the method 200 to provide access to requesters without manually establishing a trust relationship between the method 200 and the requester.

At step 240, the method 200 may access an information sharing policy associated with the requester. In some embodiments, several iterations of trust establishment may be required between the method 200 and the other entity before a mutually accepted level of trust is established therebetween. The trust level may evolve over time as the method 200 interacts with particular entities. For example, new, relatively unknown entities (e.g., requesters) may be granted a relatively low level of access to the information managed and/or controlled by the method 200. This access level may be expressed within the context of a negotiation ontology as negotiation strategies and/or rules. However, as the method 200 successfully interacts with the entity and/or by manual intervention, the trust level with the particular entity may increase (e.g., the requester may be granted additional rights to the information managed and/or controlled by the method 200). In some embodiments, the access level of the entity may be modified according to a negotiation process (described below). For instance, a requester may be granted increased access by allowing the method 200 access to information managed and/or controlled by the requesting entity (e.g., by establishing a reciprocal information sharing relationship). Similarly, information access may be predicated upon an agreement (e.g., license agreement) between the method 200 and the requester that the data will be used in a prescribed manner (e.g., as read only, not disseminated to other entities, and so on). One of skill in the art would recognize that an information sharing policy between the method 200 and the requester could be modified and/or predicated on any number of different factors.

If the method 200 determines that an information sharing policy exists, the flow may continue to step 260, where the method 200 may negotiate the request of step 220; otherwise, the flow may continue to step 250, where a new information sharing policy for the requester may be established.

At step 250, a new information sharing policy for the requester may be initialized. The information sharing policy may be based upon the negotiation ontology, strategy, and rules discussed above. In some embodiments, the information sharing policy of step 250 may be initialized according to the identity of the requester established at step 230. For example, the requester may be known to the method 200 in another context (e.g., in a business context, such as in a vendor-vendee relationship). The information sharing policy for the requester may be initialized according to the nature of the pre-existing relationship (e.g., as defined by the negotiation ontology, strategy, and/or rules). Similarly, an unknown requester whose identity and/or trust level is established by a highly trusted source (e.g., such as an identification and trust management service, such as the service 170 of FIG. 1) may affect the nature of the information sharing policy initialized at step 250 (e.g., a requester whose identity is verified by a trusted source may be granted a higher level of initial access, than a requester whose identity is self-verified and/or verified by a less-trusted source). As would be appreciated by one of skill in the art, the negotiation ontology, strategy, and rules discussed above could be used to initialize the information sharing policy based on virtually any property in the request of step 220 and/or the identity of the requester established at step 230.

At step 260, the method 200 may negotiate the request according to the information sharing policy. In some embodiments, the negotiation of step 260 may comprise comparing one or more security labels (e.g., security predicates) applied to information requested by the request of step 220 to the information sharing policy obtained at step 250 or 252. The negotiation may further comprise determining the nature of the access sought by the requester (e.g., read-only access, read and disseminate, terms of use, etc.). Negotiating the information request at step 260 may comprise accessing a negotiation ontology, a negotiation strategy, and one or more negotiation rules as described above. In addition, the negotiation may comprise determining the nature the request received at step 220. For instance, the method 200 may determine a security label (e.g., security predicate) associated with the information requested by the requester. As such, the method 200 may map the requested data onto the ontology of the method 200 (e.g., to the ontology library 124 of FIG. 1). Similarly, the negotiation may require determining the nature of the access requested (e.g., read access, write access, access according to a license, and so on). The requested access type may be mapped to the negotiation ontology. The negotiation may further comprise evaluating the terms under which the information is to be shared (e.g., licensing terms, or the like), whether the information sharing is reciprocal, or the like.

In some embodiments, the negotiation of step 260 may comprise a simple comparison to result in a "yes" or "no" decision. In other embodiments, the negotiation of step 260 may comprise the communication of one or more offers and counteroffers, wherein the information to be shared, how the information is to be shared, the terms under which the information is to be shared, and the like may be negotiated.

Figure 3:
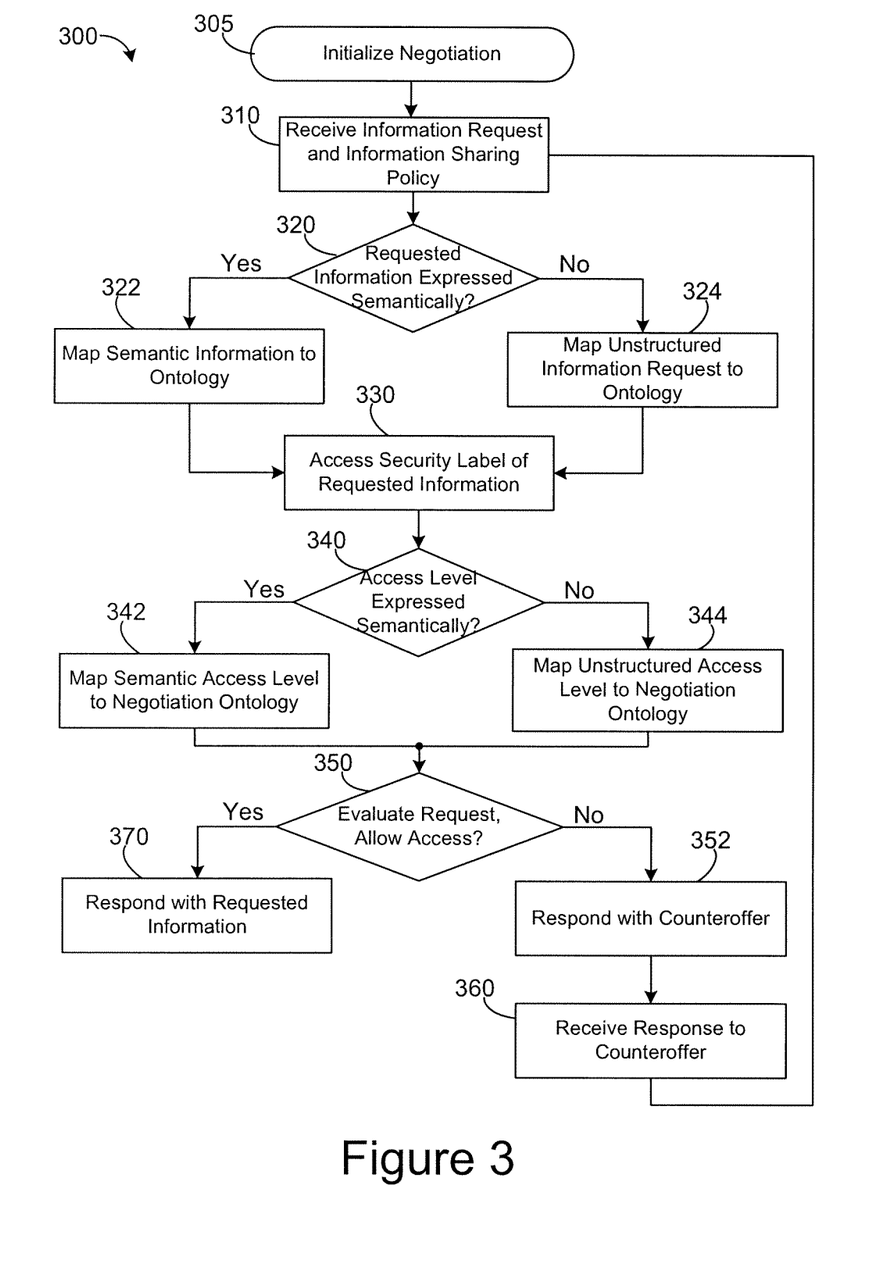
FIG. 3 is a flow diagram of one embodiment of a method for negotiating sharing of semantically secured information.

FIG. 3 depicts one embodiment of a method 300 for negotiating access to semantically secured information. At step 305, the method 300 may be initialized substantially as discussed above. The initialization may comprise accessing an ontology library associated with the method 300 (e.g., the ontology library 124 of FIG. 1), accessing a negotiation ontology, strategy, and/or rules (e.g., in the policy 122 of FIG. 1), accessing one or more security mappings and rules (e.g., in module 146 of FIG. 1), and the like.

At step 310, a request for information managed and/or controlled by the method 300 may be received. An information sharing policy associated with the requester may also be received and/or obtained at step 310. The information sharing policy may be obtained and/or generated substantially as described above in conjunction with FIG. 2.

At step 320, the method 300 may determine whether the request of step 310 requests information semantically or in an unstructured format. The determination of step 320 may allow the method 300 to map the requested information to an ontology of the method 300. For example, the information request of step 310 may refer to requested information semantically (e.g., to data within a particular ontology, in RDF format, in OWL, or the like), or, alternatively, the request may be expressed in an unstructured format (e.g., as a natural language search, in text terms, or the like). If the information request is expressed semantically, the flow may continue to step 322; otherwise, the flow may continue to step 324.

At step 322, the semantic information request may be mapped to the ontology of the method 300 (e.g., to the ontology library 124 of FIG. 1). If the method 300 uses a sparse and/or domain-specific ontology, the mapping of step 322 may comprise mapping the semantic data in the request to the domain-specific ontology of method 300 (e.g., the ontology library 124 of FIG. 1). In some embodiments, the method 300 may access a global ontology service, such as the global ontology service 160 of FIG. 1 to perform the mapping. The global ontology service may be used to translate between an ontology used by the requester to a domain-specific and/or sparse ontology of method 300. Alternatively, or in addition, the method 300 may perform the mapping using other techniques (e.g., term matching, disambiguation, or the like).

At step 324, the unstructured data in the information request may be mapped to an ontology of the method 300. The mapping of step 326 may comprise a natural language to ontology mapping (e.g., concept mapping) substantially as discussed above.

At step 330, one or more security labels associated with the information requested by request of step 310 may be obtained (e.g., security labels assigned to the semantic data determined at step 322 or 324). As discussed above, semantic information managed and/or controlled by the method 300 may comprise respective security labels (e.g., security predicates) applied using one or more security patterns. Upon mapping the request data to the ontology of method 300, these security patterns may be applied to the semantic information mapped at step 322 or 324. The resulting security labels may be obtained at step 330 and used in the negotiation process of steps 350-370 discussed below.

At step 340, the method 300 may determine whether the request of step 310 requests an access level to the information in a semantic or unstructured format. The access level may indicate the nature of the access requested at step 310. For example, a "read" access request may allow the requester to read information managed and/or controlled by the method 300, but not use the information in other ways (e.g., disseminate and/or modify the information). "Read/write" access may imply the ability to modify information managed and/or controlled by the method 300. Similarly, a "read and disseminate" access may allow the requester to read the information as well as make the information available to other entities. Various different requesters may have different terms and/or means for expressing the various requested access levels (e.g., as an Access Control List (ACL), as Unix access bit mask, or the like). In addition, the access level of step 330 may comprise terms-of-use and/or licensing information relating to the information (e.g., how the requester may use the information, etc.).

This access level information may be expressed semantically and/or in an unstructured format. If the information is expressed semantically, the flow may continue to step 342; otherwise, the flow may continue to step 344.

At step 342, the semantic access-level information in the request may be mapped to an ontology of the method 300 (e.g., to the negotiation ontology). This may allow the method 300 to determine whether the requested access level should be granted (e.g., at step 350). The mapping of step 342 may be performed substantially as described above in conjunction with step 322 and may comprise accessing a global ontology service to translate between a negotiation ontology (or other ontology) of the method 300 and an ontology used in the request.

At step 344, the unstructured (e.g., natural text or other format) access information may be mapped to the negotiation ontology (or other ontology) of the method 300. The mapping may comprise a concept mapping process discussed above (e.g., may comprise term matching, disambiguation, and the like).

Although FIG. 3 depicts translating particular portions of the request to an ontology of method 300 (e.g., the information referred to by the request and the requested access level to the information), one skilled in the art would recognize the request could comprise additional information which could similarly be translated (e.g., mapped) to the ontology of the method 300. Such information could include, but is not limited to: an identity of the requester, an attribute of the requester (e.g., an employee identifier of the requester, a social security number of the requester, contact information, etc.), a "role" of the requester within an organization (e.g., human resources, claims processing, etc.), reciprocal permissions to access data managed and/or controlled by the requester, and the like. As such, this disclosure should not be read as limited to any particular set of information with a request (e.g., within the request of step 310) and/or any particular semantic mapping of request information.

At step 350, the semantic information from the request may be used (along with the information sharing policy, negotiation ontology, strategy and rules) to determine whether access to the information, under the proposed terms, should be granted. This determination of step 350 may comprise comparing the security label (e.g., security predicate) applied to the information sought by the requester (obtained at step 330) and/or a semantic access level and/or usage terms sought by the requester (obtained at step 342 or 344), along with other information in the request, to the information sharing policy of the requester. As discussed above, in some embodiments, the negotiation evaluation of step 350 may be performed by a reasoning engine (e.g., matchmaking engine).

The evaluation of step 350 may be determined by the information sharing policy of the requester and/or negotiation policy, strategy, and/or rules of the method 300. For example, the information sharing policy and/or negotiation rules, may indicate that the requester is allowed read access to semantic information having a particular security label (e.g., a "public" security label). As such, if the security label on the information sought by the request is not "public," the request may be rejected (as discussed below). Similarly, information may include a security label indicating that the information is only available to particular entities (e.g., personal information about a person may only be available to particular requesters, such as the person him/herself, an entity having a particular role (e.g., human resources), or the like). Similarly, the security label of the information may indicate that particular types of information may only be accessed under particular terms (e.g., as "read-only," under a particular license, or the like). As could be appreciated by one of skill in the art, any number of different security labels, information sharing policy information, and/or request attributes, could be used in the semantic evaluation of step 350.

If the evaluation of step 350 indicates that the information may be shared according to the parameters within the request (e.g., the access level and/or terms-of-use within the request of step 310), the flow may continue to step 360; otherwise, the flow may continue to step 352.

At step 352, a counteroffer may be transmitted to the requester. The counteroffer may indicate what should be in the request of step 310 to cause the method 300 to allow the method 300 to accept the request. The counteroffer may be established using the negotiation ontology, strategy, and rules discussed above. For example, the negotiation strategy and rules may indicate that in order to provide access to information to a particular entity, the entity must agree to use the information under a particular set of licensing terms. The counteroffer may comprise the licensing terms and indicate that if the request is re-submitted with the terms, the request may be accepted. Alternatively, or in addition, the counteroffer may indicate that particular entity may only access information if reciprocal access is granted to another entity (e.g., information may be shared if, and only if, the entity allows its information to be shared). Similarly, the counteroffer may indicate that the information requested is secured and/or private and that only entities having a higher trust level may access it. In this case, the counteroffer may indicate one or more ways in which the entity may increase its trust level (e.g., by using a better authentication mechanism, using an out-of-band exchange, or the like). One skilled in the art could recognize that the counteroffer of step 352 could comprise any modification to the request known in the art (e.g., information type, information access level, licensing agreement, payment, etc.). As such, this disclosure should not be read as limited to any particular type or types of counteroffers.

Also at step 352, the counteroffer may be returned to the requester via a network transmission (e.g., message), out-of-band communication, or the like.

At step 360, the method 300 may receive a response to the counteroffer. The response may comprise an indication of the acceptance of one or more terms of the counteroffer of step 352 and/or a request for information. The request for information in the response of step 360 may be processed at step 310 substantially as described above.

At step 370, the information requested by the request received at step 310 may be provided to the requester. This may comprise transmitting a message comprising the information to the requester via a network (or other data transmission means). Alternatively, providing the data may comprise providing the requester with an authentication and/or authorization credential to allow the requester to access the data at another time and/or using another communications mechanism.

Figure 4:
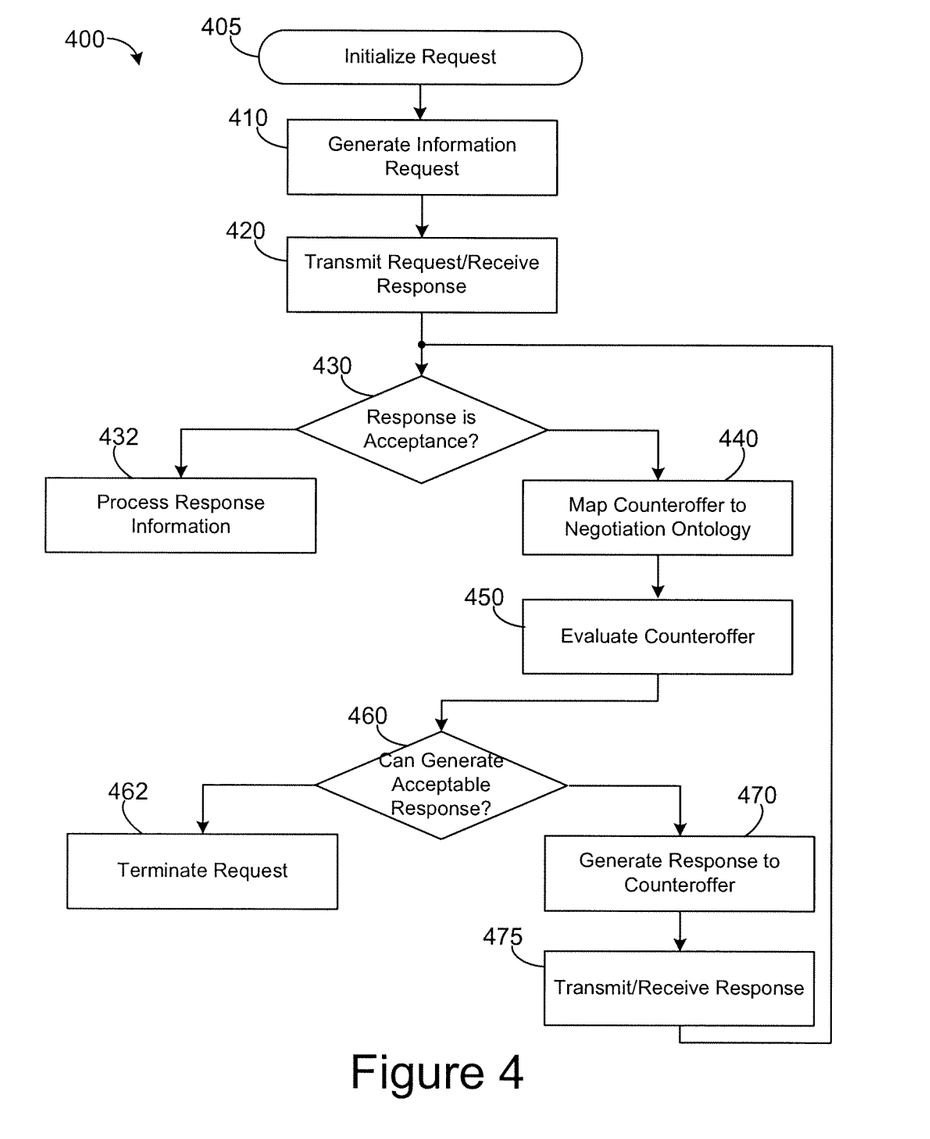
FIG. 4 is a flow diagram of one embodiment of a method for requesting semantically secured information.

FIG. 4 is a flow diagram of one embodiment of a method 400 for requesting semantic information from another entity. At step 405, the method 400 may be initialized, which may comprise accessing one or more information sharing policies, a negotiation policy, strategy, and/or rules substantially as described above.

At step 410, a request for information may be generated. In some embodiments, the request for information may be tailored to a particular entity (e.g., to Agent$_N$ 150 of FIG. 1). In this case, the contents of the request may conform to an information policy established and/or negotiated with the entity. The information sharing policy may indicate the nature of the access available to the method 400 (e.g., read, write, disseminate, terms-of-use, and the like). Similarly, the information sharing policy may indicate the nature of the information the method 400 may request, how the information is to be expressed (e.g., unstructured, semantically, in a particular ontology, or the like). If no information sharing policy for the entity exists and/or the information request is not directed to any particular entity (e.g., the information request is to be "broadcast" to a plurality of entities), the information request 410 may be general. A generalized information request may be refined during a negotiation process described below in conjunction with step 430-470.

The information request may indicate information requested by the method 400. The information request may indicate the requested information semantically and/or as an unstructured format (e.g., as a natural language search or the like). Information requested semantically may be expressed within the ontology of the method 400 (e.g., in a domain-specific ontology of the method 400, in a global ontology, within an ontology of the requestee, or the like). Similarly, the desired access level, the terms-of-use, and the like may be similarly expressed. An unstructured request may comprise natural language search terms, access control primitives, license terms, or the like.

At step 420, the information request may be transmitted and/or broadcast to one or more entities and one or more responses may be received. Each response may be processed as described below in steps 430-470.

At step 430, the method 400 may determine whether the response is an acceptance of the request. The determination of step 430 may comprise examining the response to determine whether the response includes the information requested at step 420. Alternatively, the response may comprise a key, token, or the like allowing the method to retrieve the information using another communications method (e.g., via a secure back-channel connection, such as mutually authenticated SSL or the like). If the response is an acceptance, the flow may continue to step 432.

Alternatively, portions of the response may comprise a counteroffer and/or rejection. A counteroffer and/or rejection may be processed at step 440.

At step 440, the terms of the counteroffer and/or rejection may be mapped to a negotiation ontology of the method 400. For example, a counteroffer may include licensing terms, which must be accepted for access to the requested information. The negotiation ontology may comprise a concept or other semantic data corresponding to the license. Similarly, the counteroffer and/or rejection may comprise an access level under which the information is available (e.g., only as "read-only"). This access level may be similarly mapped to the negotiation ontology. As could be appreciated by one of skill in the art, any counteroffer and/or rejection property and/or attribute could be mapped to the negotiation ontology including, but not limited to: a reciprocity request, a security label (e.g., security predicate) indicator, a trust-level requirement, a payment requirement, or the like.

At step 450, the counteroffer and/or rejection may be evaluated to determine whether the terms in the counteroffer and/or rejection may be accepted. This may comprise comparing the terms of the counteroffer and/or rejection (as expressed in the negotiation ontology) to one or more negotiation rules and/or strategies of the method 400. If the terms of the counteroffer and/or rejection are not acceptable and/or may not be modified to be acceptable, the flow may continue to step 462, where the request may be terminated; otherwise, the flow may continue to step 470.

At step 470, the negotiation strategy and/or rules may be used to respond to the counteroffer and/or rejection (e.g., using a reasoning and/or matchmaking engine). The response of step 470 may comprise acceptance of the terms of the counteroffer (e.g., by modifying a requested access-level, agreeing to terms-of-service, agreeing to provide reciprocal information access, providing a higher level of authentication credential, transferring a payment to the entity, or the like). Alternatively, or in addition, the response may modify one or more of the terms of the counteroffer and/or rejection (e.g., propose an intermediary access level to the data, propose a different payment amount, propose an alternative reciprocal information sharing arrangement, or the like). As can be appreciated by one of skill in the art, any term within the counteroffer and/or rejection of step 420 could be modified in the response of step 470.

At step 475, the response to the counteroffer and/or rejection generated at step 470 may be transmitted and/or otherwise made available to the entity and a response thereto may be received. Upon receiving a response, the flow may continue to step 430, where the response may be further processed as described above (e.g., may be further negotiated if required).

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine/computer-executable instructions stored on a memory configured to be executed by a processor within a general-purpose or special-purpose computing device, such as a personal computer, a laptop computer, a mobile computer, a personal digital assistant, smart phone, or the like. Alternatively, the steps may be performed by hardware components that include specific logic for performing the steps, or by a combination of hardware, software, and/or firmware.

Embodiments may also be provided as a computer program product including a computer-readable medium having stored instructions thereon that may be used to program a computer (or other electronic device) to perform processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of this disclosure. The scope of the present invention should, therefore, be determined only by the following claims.

What is claimed is:

1. A method for sharing semantic information performed by a system including a processor and a memory communicatively coupled to the processor, the memory storing instructions executable by the processor to cause the system to perform the method, the method comprising:
   automatically applying semantic security labels to unstructured data by,
      mapping the unstructured data to an ontology to generate semantic data,
      accessing a security policy comprising a plurality of security label statements,
      matching concepts of the mapped semantic data to semantic security patterns of the accessed semantic security statements, and
      automatically applying semantic security labels to the mapped semantic data corresponding to the matching semantic security patterns;
   receiving a request from a requester to access a portion of the semantic data;
   mapping a requested data access level of the request to a semantic context within a negotiation ontology of an information sharing policy;
   determining whether the requested access to the portion of the semantic data is to be granted to the requester based on a) the ontological mapping of the requested data access level to the negotiation ontology of the information sharing policy, b) the semantic security label automatically applied to the mapped semantic data of the request, and c) the information sharing policy;
providing access to the portion of the semantic data based on the determination; and
responding to the request with a counteroffer if the information sharing policy disallows access to the requester.

2. The method of claim 1, wherein the method further includes receiving the information sharing policy, the information sharing policy being associated with the requester.

3. The method of claim 1, wherein the request to access a portion of the semantic data is expressed semantically.

4. The method of claim 1, wherein the request to access a portion of the semantic data is expressed in an unstructured format.

5. The method of claim 1, wherein the request to access a portion of the semantic data includes information identifying the portion of the semantic data and information related to the nature of the request.

6. The method of claim 5, wherein the information related to the nature of the request includes information related to the identity of the requester.

7. The method of claim 5, wherein the information related to the nature of the request is expressed semantically.

8. The method of claim 5, wherein the information related to the nature of the request is expressed in an unstructured format.

9. The method of claim 5, wherein the method further includes mapping the information related to the nature of the request to a negotiation ontology.

10. The method of claim 9, wherein determining whether the portion of the semantic data can be accessed by the requester is further based on the mapping of the information related to the nature of the request to a negotiation ontology.

11. A system for sharing semantic information, the system comprising:
   a processor; and
   a memory communicatively coupled to the processor storing instructions that when executed by the processor cause the processor to perform a method comprising:
      automatically applying semantic security labels to unstructured data by,
         mapping the unstructured data to an ontology to generate semantic data,
         accessing a security policy comprising a plurality of security label statements,
      matching concepts of the mapped semantic data to semantic security patterns of the accessed semantic security statements, and
         automatically applying semantic security labels to the mapped semantic data corresponding to the matching semantic security patterns;
      receiving a request from a requester to access a portion of the semantic data;
      mapping a requested data access level of the request to a semantic context within a negotiation ontology of an information sharing policy;
      determining whether the requested access to the portion of the semantic data is to be granted to the requester based on a) the ontological mapping of the requested data access level to the negotiation ontology of the information sharing policy, b) the semantic security label automatically applied to the mapped semantic data of the request, and c) the information sharing policy;
      providing access to the portion of the semantic data based on the determination; and
      responding to the request with a counteroffer if the information sharing policy disallows access to the requester.

12. The system of claim 11, wherein the method further includes receiving the information sharing policy, the information sharing policy being associated with the requester.

13. The system of claim 11, wherein the request to access a portion of the semantic data is expressed semantically.

14. The system of claim 11, wherein the request to access a portion of the semantic data is expressed in an unstructured format.

15. The system of claim 11, wherein the request to access a portion of the semantic data includes information identifying the portion of the semantic data and information related to the nature of the request.

16. The system of claim 15, wherein the information related to the nature of the request includes information related to the identity of the requester.

17. The system of claim 15, wherein the information related to the nature of the request is expressed semantically.

18. The system of claim 15, wherein the information related to the nature of the request is expressed in an unstructured format.

19. The system of claim 15, wherein the method further includes mapping the information related to the nature of the request to a negotiation ontology.

20. The system of claim 19, wherein determining whether the portion of the semantic data can be accessed by the requester is further based on the mapping of the information related to the nature of the request to a negotiation ontology.

21. A non-transitory computer-readable storage medium comprising instructions that when executed by a processor cause a computer system to perform a method for sharing semantic information, the method comprising:
   automatically applying semantic security labels to unstructured data by,
      mapping the unstructured data to an ontology to generate semantic data,
      accessing a security policy comprising a plurality of security label statements,
   matching concepts of the mapped semantic data to semantic security patterns of the accessed semantic security statements, and
      automatically applying semantic security labels to the mapped semantic data corresponding to the matching semantic security patterns;
   receiving a request from a requester to access a portion of the semantic data;
   mapping a requested data access level of the request to a semantic context within a negotiation ontology of an information sharing policy;
   determining whether the requested access to the portion of the semantic data is to be granted to the requester based on a) the ontological mapping of the requested data access level to the negotiation ontology of the information sharing policy, b) the semantic security label automatically applied to the mapped semantic data of the request, and c) the information sharing policy;
   providing access to the portion of the semantic data based on the determination; and
   responding to the request with a counteroffer if the information sharing policy disallows access to the requester.

22. The non-transitory computer-readable storage medium of claim 21, wherein the method further includes receiving the information sharing policy, the information sharing policy being associated with the requester.

23. The non-transitory computer-readable storage medium of claim 21, wherein the request to access a portion of the semantic data is expressed semantically.

24. The non-transitory computer-readable storage medium of claim 21, wherein the request to access a portion of the semantic data is expressed in an unstructured format.

25. The non-transitory computer-readable storage medium of claim 21, wherein the request to access a portion of the semantic data includes information identifying the portion of the semantic data and information related to the nature of the request.

26. The non-transitory computer-readable storage medium of claim 25, wherein the information related to the nature of the request includes information related to the identity of the requester.

27. The non-transitory computer-readable storage medium of claim 25, wherein the information related to the nature of the request is expressed semantically.

28. The non-transitory computer-readable storage medium of claim 25, wherein the information related to the nature of the request is expressed in an unstructured format.

29. The non-transitory computer-readable storage medium of claim 25, wherein the method further includes mapping the information related to the nature of the request to a negotiation ontology.

30. The non-transitory computer-readable storage medium of claim 29, wherein determining whether the portion of the semantic data can be accessed by the requester is further based on the mapping of the information related to the nature of the request to a negotiation ontology.

* * * * *